June 17, 1958   J. E. THRAP ET AL   2,839,003
COMBINATION FLOW CONTROL AND RELIEF VALVE
Filed Feb. 20, 1956
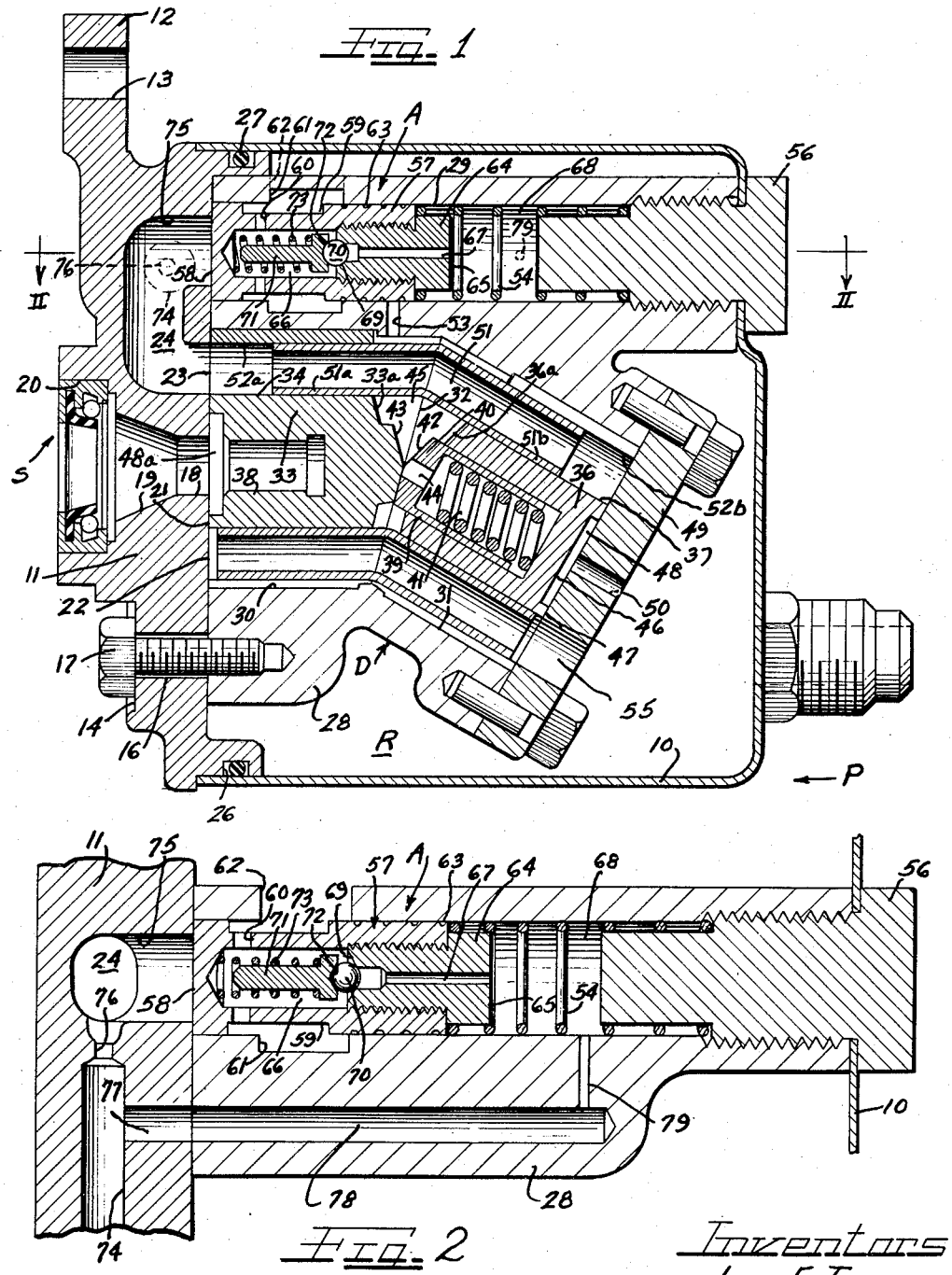
Inventors
John E. Thrap
Robert C. Roller
By Hill, Sherman, Meroni, Gross & Simpson
Attys United States Patent Office 2,839,003
Patented June 17, 1958

2,839,003

COMBINATION FLOW CONTROL AND RELIEF VALVE

John E. Thrap, East Cleveland, and Robert C. Roller, Cleveland Heights, Ohio, assignors to Thompson Products, Inc., Cleveland, Ohio, a corporation of Ohio Application February 20, 1956, Serial No. 566,510

6 Claims. (Cl. 103—42)

This invention relates generally to power-assisting apparatus and more particularly to a combination pump and control valve which is particularly suitable for application to a hydraulic circuit such as the power steering system on an automotive vehicle.

In a typical power-steering system, three major elements are provided, namely, a pump, a control valve and a power cylinder. The pump absorbs power from the engine and converts it into usable energy for the steering system. The control valve channels the energy in the proper direction. Using the energy supplied by the pump and directed by the control valve, the power cylinder assists the driver in steering the vehicle. The pump must be capable of supplying oil in sufficient quantities and at adequate pressures to meet the slightest or most extreme demands of the power cylinder in its effort to aid the operator of the vehicle.

An ordinary positive-displacement pump increases its output as its speed increases. A power-assisting pump used in a steering system, however, is required to deliver a constant predetermined volume of fluid throughout its entire speed range. The pump must also be capable of maintaining the flow of fluid regardless of the pressure demand.

In accordance with the principles of the present invention, an inproved flow control valve is integrally incorporated into the pump structure in order to maintain a constant flow level regardless of pump speed and pressure.

Heretofore, the pump mechanisms utilized in power-steering systems have taken the form of spur gear pumps. It is also a feature of the present invention to incorporate in a power-assisting unit, a sleeve-type pump and specifically a sleeve-type pump having an integral flow control means associated therewith.

It is an object of the present invention, therefore, to provide an improved power-assisting system.

Another object of the present invention is to provide an improved hydraulic pump assembly capable of delivering a constant predetermined volume of fluid throughout its speed range and capable of maintaining the flow of fluid regardless of the pressure demand at the point of utilization of pump discharge.

Yet another object of the present invention is to provide an improved combination pump and flow control means.

A further object of the present invention is to provide an improved flow control valve which will hold a constant flow level regardless of pump speed and pressure formed as an integral part of a pumping mechanism.

Many other features, advantages and additional objects of the present invention will become manifest to those versed in the art upon making reference to the detailed description which follows and the accompanying sheet of drawings in which a preferred structural embodiment of a pumping mechanism incorporating the principles of the present invention and specifically the combination flow control and relief valve of the present invention is shown by way of illustrative example.

On the drawings:

Figure 1 is a vertical cross-sectional view, with parts in elevation, of a power-steering pump in combination with a flow control and relief valve according to the present invention;

Figure 2 is a fragmentary cross-sectional view, with parts in elevation, taken substantially along the lines II—II of Figure 1.

As shown on the drawings:

The pumping assembly of the present invention incorporates a sleeve-type pump which utilizes a plurality of piston or sleeve-like elements which are actually hollow cylinders bent at an angle of approximately 30° and assembled with two cylindrical blocks in a body having the same angle as the sleeves. The assembly of these parts forms a series of tubular chambers consisting of the passage through the sleeves and the cavities at each end of each respective sleeve. Since the cylinder blocks are interconnected by the sleeves, rotation of one will cause rotation of the other, whereupon the cavities at the ends of the sleeves on the pressure side of the pump will be reduced and will become commensurately increased on the suction side of the pump. By virtue of this arrangement, a pumping action is achieved. Appropriate porting means are provided in the end plates of the pump whereby oil will be drawn into the cavities on the suction side of the pump and discharged on the pressure side of the pump. Optional porting arrangements may be provided whereby the inlet may be located at one end of the pump and the outlet located on the opposite end, or both inlet and outlet may be located at one end of the pump.

In the embodiment of the invention illustrated in Figure 1, a power-steering pump P comprises a cup-shaped casing member 10, which is closed at its open end by a valve plate cover member 11. One of a pair of mounting pads, designated by the reference numeral 12 is provided on the valve cover plate member 11 to facilitate installation of the pump P in an operating environment. The pad 12 is bored as at 13 to receive suitable fastening means. A plurality of bosses 14 and corresponding bores 16 are provided to receive an equal number of fasteners 17 for rigidly retaining an annular piston and rotary cylinder block-type pump assembly D in close abutting relationship.

The valve cover plate 11 which forms an end plate means for the pump is centrally bored as at 18 and is counterbored as at 19 to receive a drive shaft (not shown) engaged in driving assembly with the pump assembly D.

A counterbore 20, in the face of the valve plate cover member 11, receives a flexible seal assembly S, thus preventing leakage of fluid around the drive shaft.

The valve cover plate member 11 has an internal face portion 21 in which is formed a kidney-shaped inlet port 22 and a kidney-shaped outlet port 23 for the pump assembly D. A pump cavity discharge passage 24 registers with the kidney-shaped outlet port 23 and communicates pressurized working fluid to an upstream face 58 of the flow valve assembly A.

A peripheral recess 26 is provided in the valve cover plate 11 to accommodate an O-ring seal member 27 to prevent leakage of hydraulic fluid between the valve cover plate member 11 and the pump casing 10.

A reservoir chamber R is formed by the pump casing 10, the valve cover plate 11 and a housing 28 which is formed as a part of a pump assembly indicated at D.

The pump assembly D is of the angular piston and rotary cylinder block type, although it will be understood that the combination flow valve and relief valve of the present invention could be employed in a hydraulic circuit supplied by any other form of pump.

The pump D of the present invention, however, comprises the housing 28 which has formed therein a small bore 29 in register with the pump cavity discharge chamber 24. A separate larger bore 30 is also formed in the housing 28. A third bore 31 formed in the housing 28 has its axis angularly offset to the bore 30, thereby providing a plane of intersection 32 between the bores 30 and 31.

A rotor or cylinder block 33 is journaled within the bore 30 and has its axis of rotation coincident with the bore 30. Radially outwardly of the axis of the cylinder block 33 and circumferentially spaced with respect to one another, are a plurality of axially extending bores 34 forming a plurality of cylinders.

The bore 31 receives a rotor or cylinder block 36 which is likewise provided with a plurality of axially extending bores 37 spaced radially outwardly of the axis of the cylinder block 36 and forming a plurality of cylinders.

The cylinder block 33 is also provided with a centrally disposed bore or recess 38 adapted for engagement with the drive shaft extending through the valve cover plate member 11.

The cylinder block 36 has a smaller bore 39 formed therein in its internal face portion to accommodate the insertion of a hydraulic seal member 40. A spring 41 bottoms against the bottom of the bore 39 in the cylinder block 36 and the top of the seal member 40 to urge the cylinder block 36 generally outwardly of the bore 31. The spring 41 mechanically preloads the rotors 33 and 36 against the ported faces of the end plate means with sufficient force to allow the pump to prime itself and pressurize the zone between the rotors with induced flow of pressurized fluid passing through the normal clearances between movable components of the pump.

The cylinder block 36 has a recessed portion 46 formed in its external face portion 47 providing a space between the sealing and porting surfaces and referenced to a zone at pressure lower than the pressure in the knee portion 45 of the pump between the rotors or cylinder blocks 33 and 36. For example, a passageway 50 connects the reservoir R with the space 48. A similar recess is located at the drive end of the pump between the sealing and porting surfaces and is indicated at 48a.

A plurality of hollow angled pistons 51 each have an arm portion 51a journaled in the cylinder block 33 and an arm portion 51b journaled in the cylinder block 36. A plurality of pumping chambers 52a adjacent the arm portion 51a and a plurality of pumping chambers 52b adjacent the arm portion 51b are formed between the valve cover plate member 11 and the pump housing closure member 49.

The back surfaces of the rotors or cylinder blocks 33 and 36 form motive surfaces 33a and 36a which together with means including a portion of the housing 28 form a pressure control chamber 45. Induced flow of fluid into the pressure chamber 45 is less than the discharge pressure generated in the pumping chambers 52a and 52b and is greater than the inlet pressure of the pump.

The arm portions 51a and 51b thus link the cylinder blocks 33 and 36 for corotation whereby any rotation of the cylinder block 33 will simultaneously cause the cylinder block 36 to rotate in unison therewith.

A pressure relief passage 53 registers with the central chamber space 45 between the cylinder blocks 33 and 36 to permit a venting of this chamber to a lower pressure whenever a predetermined discharge pressure or flow rate is attained in the hydraulic circuit.

In the operation of the pump assembly D, rotation of the cylinder block 33 causes a corresponding rotation of the cylinder block 36 through the connecting arm portions 51a and 51b of the hollow pistons 51. The effective volume of of the bores 34 and 37 interconnected by the hollow sleeves 51 changes upon rotation of the cylinder blocks 33 and 36, thereby producing an alternate suction and expulsion in the pumping chambers 52a and 52b. Working fluid is drawn into a pump inlet 55 formed in the end plate means 49 and is expelled through the pump outlet port 23 in the face of the cover plate member 11 to the pump cavity discharge passage 24. It will be understood by those versed in the art that the porting arrangements between the end plate means provided at opposite ends of the pump such as the plate 11 and the plate 49 may be optionally varied in different combinations of inlets and outlets, as referred to hereinabove.

As pressure increases in the pumping chambers 52a and 52b, an induced pressure flow occurs which results in a pressure build up within the chamber 45. For example, fluid flow occurs in the normal clearances existing in the respective cylinder blocks 33 and 36. The pressure in the chamber 45 acts on the motive surfaces 33a and 36a provided on the end of the cylinder blocks 33 and 36, thereby pressure-loading the blocks into hydraulic sealing relationship with the valve cover plate 11 and the pump housing closure member 49.

The hydraulic sealing force acting on the internal faces of the cylinder blocks 33 and 36 increases proportionately with pump discharge pressure, however, when the passage 53 vents the central chamber 45 to the reservoir R, as determined by a flow control valve assembly A, the cylinder blocks will move together a slight amount to effect a direct by-pass across the porting surfaces between the pump inlet and the pump outlet.

Thus it will be appreciated that the pump D presents a hydraulic power source for the hydraulic circuit of a power-steering pump assembly P having a variable discharge readily controlled through the recirculation of discharge flow to a reservoir and by selectively breaking the hydraulic balance between the rotating cylinder block assemblies and end closure members to allow direct interport flow recirculation.

Referring now more particularly to the flow valve assembly A and illustrated in Figure 2 as well as in Figure 1, it will be noted that the valve A is positioned in the bore 29 of the pump housing 28 and is urged upstream against the pump cavity chamber 24 in the valve cover plate member 11 by a coil spring 54 which bottoms on a closure plug member 56 in a threaded portion of the downstream end of the bore 29.

The flow valve assembly A is comprised of a hollow flow valve spool 57 having a front face portion 58 abutting the valve cover plate 11. A reduced diameter portion 59 is provided at an intermediate portion of the valve spool 57 and has formed therein one or more ports or slots 60 forming a by-pass passage and extending into the hollow internal portion of the flow valve spool 57. The pump housing 28 has a corresponding annular recess 61 formed therein adjacent the reduced diameter portion 59 to form a spillway passage carrying by-passed working fluid. A communicating passageway 62 registers with the spillway passage 61 to form a return for by-passed working fluid to the reservoir R.

A plurality of annular grooves or undercuts 63 may be provided, if desired, in the peripheral surface of the flow valve spool 57, as shown in the drawings, in order to balance pressures acting on the periphery of the valve spool 57.

A plug 64 is threaded into the open end portion of the flow valve spool 57 thereby forming a chamber 66 in the hollow internal portion of the flow valve spool 57.

The plug 64 includes a centrally disposed relief passage 67 which communicates the chamber 66 in the flow relief valve spool 57 with a downstream chamber 68 formed between the valve assembly A and the plug 56.

A valve seat 69 is formed in the plug 64 and seats a ball-type valve 70. A ball guide 71 engages the ball valve 70 at a face portion indicated at 72. A coil spring 73 extending around the shank of the guide 71 operates as a control spring and maintains the ball valve 70 in seated relationship throughout a normal range of operating pressure in the hydraulic circuit.

A main discharge passage 74 is formed in the housing and it will be noted that means are also provided forming a metering orifice 76 through which all of the pressurized fluid supplied to the hydraulic circuit by the pump D flows.

The pressure differential which results because of the pressure drop across the orifice and producing different pressures on opposite sides of the orifice is used as a controlling variable in regulating the movement of the valve, whereby the valve will operate as a function of the flow rate.

To effect that end, a bleed passage 78 communicates metered discharge fluid from the main discharge passageway into a pressure space or pressure passage 78 formed in the pump housing 28. An angularly intersecting passageway 79 is further formed in the housing and communicates the passageway 78 with the chamber 68 which forms a pressure space behind the rear face 65 of the valve.

Full pump discharge pressure on the opposite side of the orifice 76 is carried by a passageway 75 formed in the pump housing which is normally closed by the front surface or front end face 58 of the valve spool. Accordingly, the forces acting on the valve spool in one direction include the pressures on one side of the orifice 76 and the pressures acting on the valve spool in an opposite direction include the pressure on the opposite side of the orifice 76 together with the pressure exerted by the control spring 54.

In operation, the combination flow control and relief valve A will be initially closed by the coil spring 54. As pump speeds increase, the rate of flow through the orifice 76 also increases, thereby increasing the pressure drop exhibited across the orifice 76. As variations in the pressure drop occur, the net effective forces acting on the valve spool 57 change by virtue of the pressures in the discharge chamber 24 acting on the front face 58 and the pressure in the pressure space 68 acting on the rear face or back face 65 of the valve spool 57. As the flow continues to increase, the pressure differential effects movement of the flow valve assembly A until the spillway passages 61 are uncovered, thereby intercommunicating the spillway passages 61 with the passageway 75 and permitting a direct by-passing of fluid from the chamber 24 through the spillway passages 61 to the reservoir R.

Movement of the valve assembly A will also place the reduced diameter portion 59 of the valve spool in register with the passage 53, thereby venting the chamber 45 to a zone at lower pressure, namely, the reservoir R. The hydraulic sealing force holding the blocks 33 and 36 against the valve cover plate 11 and the pump housing cover member 49 will, therefore, be reduced, permitting direct interport circulation in the pump D, with a corresponding reduction in pump output and volumetric efficiency.

The flow valve assembly A also functions as a relief valve to prevent excessive pressure build up in the hydraulic system or in the hydraulic circuit with which the pump is associated. Under conditions of excessive pressure, the ball valve 70 will be unseated, thereby relieving pressure in the pressure space or chamber 68 by a venting action to the reservoir R through the passage 67 and the port 60. This causes an unbalance between the forces acting on the front face 58 and the back face 65, whereby the flow valve assembly A will move a sufficient amount to fully uncover the spillway 61 and bring the knee portion relief passage 53 into registry with the reduced diameter portion 59 in the flow valve spool 57. Full interpassage and interport recirculation will thereupon result, preventing any further increase in discharge pressure.

Reducing the pressure in the knee will also unbalance the cylinder blocks causing them to move away from the ports; and the pumping action will be less positive, resulting in lower discharge because a portion of oil is by-passed directly from the discharge port to the suction port, resulting in lower horsepower requirements and cooler operating characteristics.

Thus it will be appreciated that the combination flow control relief valve A presents an entirely novel flow control mechanism which is capable of maintaining a substantially uniform flow of hydraulic fluid from a given generating source regardless of a wide range of fluctuations in the flow output with safety provision for fully by-passing the entire output flow in the event an excessive pressure build-up occurs within the hydraulic circuit.

Although other modifications and variations might be suggested by those versed in the art, it should be understood that we wish to embody within the scope of the patent warranted hereon all such modifications as reasonably and properly come within the scope of our contribution to the art.

We claim as our invention:

1. In combination, a sleeve pump comprising a housing having an inlet and an outlet, fluid displacement means in said housing comprising a pair of apertured cylinder blocks journaling an angularly bent sleeve-type piston and, in turn, journaled for rotation in said housing on intersecting axes disposed on the same angle as said sleeve-type piston, said housing having porting means at one end of each said cylinder block cooperating with an adjoining end surface of a corresponding cylinder block, loading means in said housing between the cylinder blocks for loading the cylinder blocks against the porting means and including a pressure-control chamber receiving an induced flow of fluid pressurized by the pump and passing through the clearance spaces between said piston and said cylinder blocks, a recirculating by-pass between said outlet and said inlet, and a flow control valve in said outlet in control of said by-pass, a passage communicating with said pressure control chamber, said valve having auxiliary means in control of said passage to reduce the pressure in said pressure control chamber whenever maximum volumetric efficiency is not required, thereby to unbalance the cylinder blocks and effect a direct by-pass at said porting means.

2. In combination, a sleeve pump comprising a housing having an inlet and an outlet, fluid displacement means in said housing comprising a pair of apertured rotors journaling an angularly bent sleeve-type piston and, in turn, journaled for rotation in said housing on intersecting axes disposed on the same angle as said sleeve-type piston, said housing having porting means at one end of each said rotor cooperating with an adjoining end surface of a corresponding rotor, loading means in said housing between the rotors for loading the rotors against the porting means and including a pressure-control chamber receiving an induced flow of fluid pressurized by the pump and passing through the clearance spaces between said piston and said rotors, a recirculating by-pass between said outlet and said inlet, and a movable flow control valve in said outlet in control of said by-pass, a passage communicating with said pressure-control chamber, said valve having auxiliary means in control of said passage to reduce the pressure in said pressure-control chamber whenever maximum volumetric efficiency is not required, thereby to unbalance the rotors and effect a direct by-pass at said porting means, means forming an orifice through which the output of said pump is discharged, said valve having pressure-responsive surfaces thereon subject to the variations in pressure drop across said orifice to move the valve for controlling the recirculation of fluid to said inlet as a function of the pressure drop across said orifice.

3. In combination, a sleeve pump comprising a pump housing having an inlet and an outlet, said sleeve pump also having a plurality of angularly bent sleeves, a pair of apertured cylinder blocks interconnected by said sleeves, a housing journaling said blocks for rotation on intersecting axes angularly disposed at the same angle as the sleeves, end plate means for the housing having surfaces with inlet and outlet ports formed therein abutting against the adjoining face of a corresponding one of said cylinder blocks, said cylinder blocks together with means including said housing forming a pressure-control chamber receiving an induced flow of fluid at pressure generated by the pump through the running clearances between said sleeves and said blocks, continuous biasing means operatively interposed between said blocks for mechanically preloading said cylinder blocks against said end plate means with sufficient force to allow the pump to prime itself and to pressurize said pressure control chamber, said blocks having motive surfaces thereon subject to the pressures in said pressure-control chamber for sealing said blocks against said end plate means by hydraulically balancing the forces acting on said faces of said blocks, discharge means in said housing for conducting the output of said sleeve pump to a point of utilization including a recirculating by-pass to the pump inlet, a movable spool valve in control of said by-pass responsive to variations in the flow rate output of said pump, said housing having a passageway formed therein communicating with said pressure-control chamber, said spool valve having means formed thereon regulating said passageway to temporarily reduce the pressure in said pressure-control chamber, thereby unbalancing the cylinder blocks to effect a direct by-pass between the ports of said end plate means.

4. A pumping assembly comprising a housing having an inlet and an outlet, rotary fluid-displacement means of the angularly-related piston and variable volume cylinder type including a rotatable axially movable cylinder block having a sealing surface on one end intersected by a plurality of cylinder bores, porting means providing a porting surface adjoining said sealing surface controlling the flow of fluid from said inlet to said bores and through said outlet, a motive surface on the other end of said cylinder block forming together with means including a portion of said housing a pressure space receiving fluid at increased pressure generated by the pump thereby loading the cylinder block axially against said porting surface, a recirculating by-pass between said outlet and said inlet, and a flow control valve in said outlet in control of said by-pass, a passage communicating with said pressure space, said valve having auxiliary means in control of said passage to temporarily reduce the pressure in said pressure spaced whenever maximum volumetric efficiency is not required, thereby to unload said cylinder block for effecting a direct interport by-pass at said porting means.

5. A pumping assembly comprising a housing having an inlet and an outlet, rotary fluid-displacement means of the angularly-related piston and variable volume cylinder type including, a rotatable axially movable cylinder block having a sealing surface on one end intersected by a plurality of cylinder bores, porting means providing a porting surface adjoining said sealing surface controlling the flow of fluid from said inlet to said bores and through said outlet, a motive surface on the other end of said cylinder block forming together with means including a portion of said housing a pressure space receiving fluid at increased pressure generated by the pump, thereby loading the cylinder block axially against said porting surface, a recirculating by-pass between said outlet and said inlet, and a flow control valve in said outlet in control of said by-pass, a passage communicating with said pressure space, said valve having auxiliary means in control of said passage to reduce the pressure in said pressure space whenever maximum volumetric efficiency is not required, thereby to unload said cylinder block and effect a direct by-pass at said porting means between the inlet and the outlet, means forming an orifice through which the output of said pump is discharged, said valve being movable in response to variations in the pressure drop across said orifice for controlling the recirculation of fluid to said inlet as a function of the pressure drop across said orifice.

6. A pumping assembly comprising a housing having an inlet and an outlet, rotary fluid-displacement means of the angularly-related piston and variable volume cylinder type including, a rotatable axially movable cylinder block having a sealing surface on one end intersected by a plurality of cylinder bores, porting means providing a porting surface adjoining said sealing surface controlling the flow of fluid from said inlet to said bores and through said outlet, a motive surface on the other end of said cylinder block forming together with means including a portion of said housing a pressure space receiving fluid at increased pressure generated by the pump, thereby loading the cylinder block axially against said porting surface, continuous biasing means acting against said cylinder block for mechanically preloading said cylinder block against said porting means with sufficient force to allow the pump to prime itself and to pressurize said pressure space, discharge means in said housing for conducting the output of said pump to a point of utilization including a recirculating by-pass to said inlet, a movable spool valve in control of said by-pass responsive to variations in the flow rate output of said pump, said housing having a passageway formed therein communicating with said pressure space, said spool valve having means formed thereon regulating said passageway to temporarily reduce the pressure in said pressure space, thereby unloading said cylinder block to effect a direct by-pass between the inlet and the outlet at said porting surface.

References Cited in the file of this patent

UNITED STATES PATENTS

| | | |
|---|---|---|
| 2,429,489 | Roth | Oct. 21, 1947 |
| 2,437,791 | Roth et al. | Mar. 16, 1948 |
| 2,473,953 | Huber et al. | June 21, 1949 |
| 2,501,054 | Huber | Mar. 21, 1950 |
| 2,656,846 | Anderson | Oct. 27, 1953 |